United States Patent
Ohba et al.

(10) Patent No.: US 6,877,344 B2
(45) Date of Patent: Apr. 12, 2005

(54) PREPARATION OF OPTICAL FIBER (75) Inventors: Toshio Ohba, Annaka (JP); Nobuo Kawada, Annaka (JP); Masaya Ueno, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 479 days.

(21) Appl. No.: 10/077,975

(22) Filed: Feb. 20, 2002

(65) Prior Publication Data

US 2002/0112508 A1 Aug. 22, 2002

(30) Foreign Application Priority Data

Feb. 20, 2001 (JP) ........................................ 2001-043407
Jun. 22, 2001 (JP) ........................................ 2001-189609

(51) Int. Cl.[7] .......................... C03B 37/01; G21G 5/00; C08F 2/46

(52) U.S. Cl. ............................. 65/425; 65/441; 65/432; 250/492.3; 427/493

(58) Field of Search ............................. 427/493, 163.2, 427/331, 407.1, 407.2, 458, 487, 495, 501, 532, 547, 551, 566, 596, 598; 250/492.3, 400, 433; 65/60.1–60.8, 424, 425, 430, 432, 441, 447

(56) References Cited

U.S. PATENT DOCUMENTS

| | | | | |
|---|---|---|---|---|
| 2,729,748 A | * | 1/1956 | Robinson | 250/400 |
| 2,887,584 A | * | 5/1959 | Nygard | 250/453.11 |
| 2,989,633 A | * | 6/1961 | Wilson | 250/453.11 |
| 5,000,772 A | * | 3/1991 | Petisce | 65/425 |
| 5,217,518 A | | 6/1993 | Petisce | |

(Continued)

FOREIGN PATENT DOCUMENTS

| | | |
|---|---|---|
| EP | 0 445 980 A2 | 9/1991 |
| JP | 62 162 655 | 7/1987 |
| JP | 1-19694 | 4/1989 |
| JP | 5-50454 | 7/1993 |
| JP | 2522663 | 5/1996 |
| JP | 2547021 | 8/1996 |
| WO | 97/37951 | 10/1997 |

OTHER PUBLICATIONS

Murata, Kenji et al., "Monte Carlo Calculations on Electron Scattering in a Solid Target" Japanese Journal of Applied Physics, vol. 10, No. 6, Jun. 1971, pp. 678–686.

Shimizu, Ryuichi et al., "The Monte Carlo technique as applied to the fundamentals of EPMA and SEM" J. Appl. Phys., vol. 43, No. 10, Oct. 1972, pp. 4233–4249.

Murata, Kenji et al., "Monte Carlo simulation of fast secondary electron production in electron beam resists", J. Appl. Phys., vol. 52, No. 7, Jul. 1981, pp. 4396–4404.

Pandey L.N., "A comparative study of electron transport phenomenon in the keV range", J. Appl. Phys., vol. 66, No. 12, Dec. 1989, pp. 6059–6064.

*Primary Examiner*—Steven P. Griffin
*Assistant Examiner*—Lisa Herring
(74) *Attorney, Agent, or Firm*—Birch, Stewart, Kolasch, Birch, LLP (57) ABSTRACT

An optical fiber is prepared by applying a liquid electron beam-curable resin composition to a bare optical fiber or a coated optical fiber having a primary or secondary coating on a bare optical fiber, irradiating electron beams to the resin composition on the optical fiber for curing while the optical fiber passes a zone under substantially atmospheric pressure, and providing a magnetic field and optionally an electric field in the zone for thereby improving the efficiency of electron irradiation. The method can comply with the increased drawing speed of the bare optical fiber and does not detract from the transmission properties of the optical fiber.

11 Claims, 8 Drawing Sheets

U.S. PATENT DOCUMENTS

| | | |
|---|---|---|
| 5,219,623 A | 6/1993 | Petisce |
| 5,812,725 A * | 9/1998 | Petisce ........................ 385/128 |
| 6,214,899 B1 * | 4/2001 | Chawla et al. ................. 522/84 |
| 6,265,476 B1 * | 7/2001 | Krongauz et al. .......... 524/262 |
| 6,534,557 B2 * | 3/2003 | Szum et al. ................... 522/90 |
| 6,553,169 B2 * | 4/2003 | Fabian ........................ 385/128 |
| 6,563,996 B1 * | 5/2003 | Winningham ............... 385/128 |
| 6,602,601 B2 * | 8/2003 | Fewkes et al. .............. 428/378 |

* cited by examiner

1T IN NITROGEN (GRADUATION : 1mm)

FIG.4

1T IN HELIUM (GRADUATION : 1mm)

FIG.5

NO MAGNETIC FIELD (GRADUATION : 1mm)

PREPARATION OF OPTICAL FIBER

This invention relates to a method for preparing an optical fiber on which a liquid electron beam-curable resin composition is coated and cured with electron beams at a high efficiency of irradiation.

BACKGROUND OF THE INVENTION

Upon propagating through a material, electron beams gradually deliver part of their energy to the material by exciting orbital electrons in the material to give rise to chemical reaction or generate secondary electrons and x-rays and thus decelerate while the electron beams are scattered to progress in diverse directions or diffuse. This tendency becomes outstanding especially in a high density material such as a solid. Electron beams having such nature have already been used in the curing of print ink, paint, and removers for stripping sticky substances. On the other hand, an apparatus for irradiating electron beams generally includes an electron emitting means and an electron accelerating means. The prior art apparatus used in the curing of resins is generally designed so as to irradiate electron beams over a large area for increased productivity. Apparatus operable at relatively low accelerating voltage adopt the so-called curtain type consisting of an electron emitting and accelerating means for producing a wide band of electron beams while apparatus operable at relatively high accelerating voltage adopt the so-called scan type consisting of an electron emitting and accelerating means for producing a narrow strip of electron beams and an electron scanning means for distributing the beams over a larger area.

Electrons are emitted and accelerated in vacuum while they are irradiated to an article in an atmospheric environment that assures ease of continuous treatment from the productivity standpoint. Most often, the atmospheric environment and the vacuum are partitioned by a window in the form of a thin metal foil by which electron beams are transmitted so that electron beams are taken from the vacuum to the atmospheric environment. When electron beams are transmitted by the window, they are substantially scattered. Such diffusion of electron beams after window passage is not problematic because electron beams are to be irradiated over a large area. When electron beams are irradiated to a very thin member such as optical fiber, however, the efficiency of irradiation is very low. On the other hand, when electron beams are irradiated in vacuum, the technique of converging electron beams under the action of a magnetic field has been established and utilized in electron beam welders or the like. If electron beams are continuously irradiated to a length of resin-coated optical fiber in vacuum, it is difficult to maintain the degree of vacuum constant and there is a risk that the resin can foam and scatter away.

JP-B 5-50454 discloses the electron beam curing of optical fiber coating materials, but does not refer to the irradiation efficiency of electron beams. The technique of continuously irradiating electron beams to an optical fiber under atmospheric pressure at a high efficiency has not been established.

Current optical fibers include a variety of types such as quartz glass, multi-component glass and plastic fibers. Among these, quartz glass type optical fibers are vastly used in a wide variety of applications because of their light weight, low loss, durability and high transmission capacity. Since quartz glass type optical fibers are as thin as having a diameter of 125 μm typical to the most commonly used fibers, they are vulnerable to failure even with faint flaw and increase the transmission loss by external stresses as by bending. For this reason, the optical fibers are generally provided with a resin coating of two layers, a relatively soft primary coating layer and a secondary coating layer enclosing the primary coating layer. Most often, immediately after drawing from a melt, a bare optical fiber is coated with a liquid resin by a die coating technique or the like, which is cured with heat or radiation (typically UV radiation). The secondary coating is applied and cured simultaneously with or subsequent to the application and curing of the primary coating. The thus coated optical fiber, which is generally designated coated optical fiber or simply optical fiber, is colored with ink for identification. A tape element is fabricated by bundling several, typically four or eight, coated optical fibers and coating the bundle with a taping material or liquid resin, followed by heating or radiation (typically UV) exposure for curing.

Typical of the coating material are urethane acrylate base UV-curable resin compositions. As disclosed in JP-B 1-19694 and Japanese Patent Nos. 2,522,663 and 2,547,021, liquid UV-curable resin compositions comprising a urethane acrylate oligomer, a reactive diluent, and a photo-polymerization initiator are known.

In the recent manufacture of optical fibers, the drawing speed of optical fibers has increased for productivity improvement purposes. The energy per unit time required to cure the resin coating material has to be increased. However, the customary UV curing technique is in the state that any output increase devised for UV lamps has not caught up with the progress. Then a number of UV irradiating lamps must be arranged in series. The production speed is limited by the dimensions of a space where lamps can be installed.

It is generally believed that electron beam curing is energy efficient as compared with UV curing. This is true only when an article to be irradiated with electron beams has a large area as in resin curing in the case of coated paper and printing ink, so that electron beams, even when diffused, may impinge anywhere on the article. If the prior art electron beam irradiating apparatus of the curtain type is used in order to irradiate electron beams to a thin elongated wire (e.g., optical fiber), the proportion of effective electrons impinging on the thin wire is very low because of the substantial scattering of electron beams upon transmission through the metal foil, even when the direction of a band of electron beams is matched with the longitudinal direction of the thin wire. This leads to the problem of very low energy efficiency. On use of the electron beam irradiating apparatus of the scan type, even if electron beams could be kept stationary on the thin wire without scanning, there also arises the problem of low energy efficiency because of the substantial scattering of electron beams upon transmission through the metal foil. In the event where a polyethylene coated electric conductor is subject to electron beam crosslinking, the problem can be overcome by moving the conductor in turns so that the conductor passes many times the irradiating chamber. This approach is not employable in the electron beam curing of a liquid coating composition on an optical fiber, because bending of the coated fiber prior to complete cure can cause the coating to be damaged or stripped.

Another problem is that when electron beams are irradiated to a coating material on optical fibers which are doped with germanium, the germanium can be altered, resulting in an undesirably increased transmission loss.

SUMMARY OF THE INVENTION

An object of the invention is to provide a method for preparing an optical fiber by applying a liquid electron beam-curable resin composition to a traveling bare optical fiber, and uniformly, efficiently and continuously irradiating electron beams to the composition on the fiber so that the method may comply with the increased drawing speed of the bare optical fiber while the method does not compromise the transmission properties of the optical fiber.

We have found that when electron beams which have been scattered when they are transmitted by a window in the form of a metal foil serving as a partition between a vacuum electron beam-emitting section and an atmospheric irradiation section are irradiated to a liquid composition of electron beam-curable resin coated on a bare optical fiber under atmospheric pressure for curing, the provision of a magnetic field in the atmospheric irradiation section where the coated optical fiber passes is effective for improving the efficiency of electron irradiation. The provision of both an electric field and a magnetic field in the atmospheric irradiation section where the coated optical fiber passes is more effective for improving the efficiency of electron irradiation. Especially when the magnetic field is applied in a direction parallel to the path of the traveling optical fiber, and the electric field is applied in a direction perpendicular to the path of the traveling optical fiber, electrons which have been transmitted by the window and scattered thereby are two-dimensionally converged on the optical fiber. The invention is predicated on these findings.

In a first aspect, the invention provides a method for preparing an optical fiber, comprising the steps of applying a liquid composition of an electron beam-curable resin to a bare optical fiber or a coated optical fiber having a primary or secondary coating on a bare optical fiber; irradiating electron beams to the resin composition on the optical fiber for curing while the optical fiber passes a zone under substantially atmospheric pressure; and providing a magnetic field in the zone for thereby improving the efficiency of electron irradiation.

In a second aspect, the invention provides a method for preparing an optical fiber, comprising the steps of applying a liquid composition of an electron beam-curable resin to a bare optical fiber or a coated optical fiber having a primary or secondary coating on a bare optical fiber; irradiating electron beams to the resin composition on the optical fiber for curing while the optical fiber passes a zone under substantially atmospheric pressure; and providing an electric field and a magnetic field in the zone so that the electron beams pass across the electric field and the magnetic field to two-dimensionally converge on the optical fiber. In a preferred embodiment, the magnetic field has a direction parallel to the path of the optical fiber, and the electric field has a direction perpendicular to the path of the optical fiber.

In preferred embodiments, the magnetic field has a magnetic flux density of at least 0.1 T; the zone where the coated fiber passes has an inert gas atmosphere, typically of helium; the electron beams have been accelerated at a voltage of 60 to 160 kV; and the liquid composition comprises a polyether urethane acrylate oligomer and a reactive diluent.

BRIEF DESCRIPTION OF THE DRAWINGS

The above and other objects, features and advantages of the invention will be better understood by reading the following description taken in conjunction with the accompanying drawings.

DESCRIPTION OF THE PREFERRED EMBODIMENTS

Figure 1:
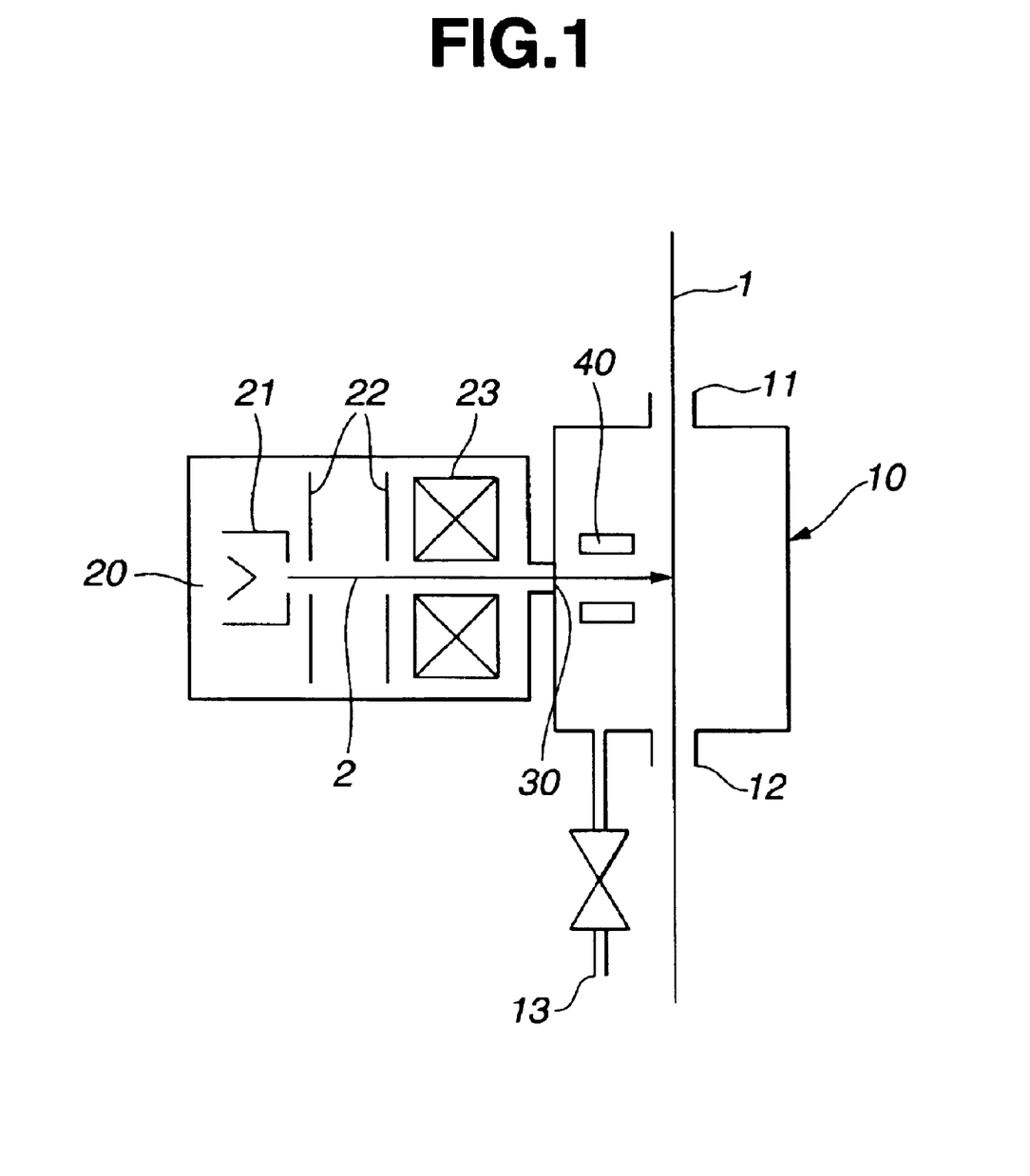
FIG. 1 is a schematic cross-sectional view of an optical fiber preparing apparatus according to one embodiment of the invention.

Referring to FIG. 1, there is illustrated an optical fiber preparing apparatus used in one embodiment of the invention. The apparatus includes a cylindrical electron beam irradiating chamber or zone 10 having closed opposite end faces which are provided with openings 11 and 12 serving as an inlet and an outlet for a traveling optical fiber 1, respectively. The optical fiber 1 enters the EB irradiating chamber 10 from one opening or inlet 11, passes the chamber 10 at the center where an electron beam 2 is irradiated, and exits from the other opening or outlet 12. A means for establishing an inert gas atmosphere in the chamber 10 in the form of an inert gas line 13 is connected to the other end face of the chamber 10. The line 13 supplies an inert gas such as helium or nitrogen to the chamber 10 so that irradiation of the optical fiber 1 with electron beams in the chamber 10 can be performed in the inert gas atmosphere.

An electron beam producing unit 20 in the form of a closed box includes a means 21 for emitting electrons, a means 22 for accelerating the electrons, and a means 23 for converging the accelerated electrons. The electron beam producing unit 20 is joined to the electron beam irradiating chamber 10 so that the electron beam 2 is projected into the chamber 10.

There may be arranged one or more electron beam producing units 20 around the irradiating chamber 10. Where a plurality of electron beam producing units 20 are used, they are preferably arranged at substantially equal intervals so as to surround the irradiating chamber 10. For instance, where three electron beam producing units 20 are used, they are preferably spaced apart 120° about the irradiating chamber 10.

A window 30 is disposed between the electron beam producing unit 20 and the irradiating chamber 10 as a partition therebetween. The window 30 ensures that the interior of the electron beam producing unit 20 is maintained in vacuum, and that the electron beam 2 generated in the electron beam producing unit 20 is transmitted by the window 30 and enters the irradiating chamber 10 held under substantially atmospheric pressure where the electron beam 2 is irradiated to a liquid electron beam-curable resin composition coated on the optical fiber 1.

A magnetic field generating means 40 is disposed within the electron beam irradiating chamber 10 for applying a magnetic field across the electron beam 2. The electron beam 2 having entered the irradiating chamber 10 past the window 30 passes through the magnetic field so that the electron beam 2 is converged toward the optical fiber 1.

As mentioned above, the electron beam producing unit includes the electron emitting means, electron accelerating means and optionally electron converging means. The electron emitting means may be any conventional well-known electron emitting source utilizing the phenomenon of thermionic emission, secondary electron emission, field electron emission or photoelectric emission, for example, hot cathodes of tungsten or lanthanum boride and glow discharge cold cathodes. The electron accelerating means may be any conventional well-known electron accelerator utilizing a dc electric field or radio-frequency electric field, such as a dc electric field developed by applying a high dc voltage between parallel plate electrodes or a radio-frequency electric field developed by applying a radio-frequency voltage across a cavity resonator. The electron converging means may be any conventional well-known electron converging means including electrostatic lenses and magnetic lenses such as an electrostatic lens constructed of three electrode plates and a magnetic lens constructed of permanent magnets or solenoids.

The electron beam producing unit may utilize a rod-, plate- or disc-shaped filament and perforated grids of the same shape, as long as it can emit and accelerate electrons toward the optical fiber.

The window serving as the partition between the vacuum electron beam producing unit and the electron beam irradiating chamber should maintain the vacuum in the unit, but allow electrons to be transmitted thereby. A foil of an element having a relatively small atomic number such as Ti, Al, Si or C is often used since it has strength and permeability to electrons. The gage of the foil is generally set in the range of 3 to 15 $\mu$m so as to meet the above requirement.

While electrons are scattered upon passage through the window, the magnetic field acts to converge such scattered electrons toward the optical fiber for thereby improving the efficiency of electron irradiation to the optical fiber. The magnetic field can be produced by a permanent magnet or an electromagnet constructed of solenoids.

The direction of the magnetic field is not critical as long as an improvement in irradiation efficiency is achievable. The magnetic field may be applied in any direction perpendicular, parallel or oblique to the optical fiber. For example, in the embodiment wherein electrons are irradiated to the optical fiber at right angles, a magnetic field parallel to the electron path is preferred. The magnetic field should desirably have a sufficient magnetic flux density of at least 0.1 T to change the direction of electrons. As the magnetic field becomes stronger, the magnetic field generating device becomes larger, albeit only a least improvement in irradiation effect is achievable thereby. For this reason, a magnetic flux density of 0.1 to 5 T is desirable. In designing the direction and strength of the magnetic field, it is important to take into account such factors as the electron accelerating voltage, window material, and window-to-optical fiber distance. The distance from the window to the optical fiber is usually set to 3 to 50 mm, especially 5 to 30 mm.

It is possible to provide a plurality of magnetic fields associated with a plurality of electron beam producing units, in order to augment the advantages of the invention.

Figure 2:
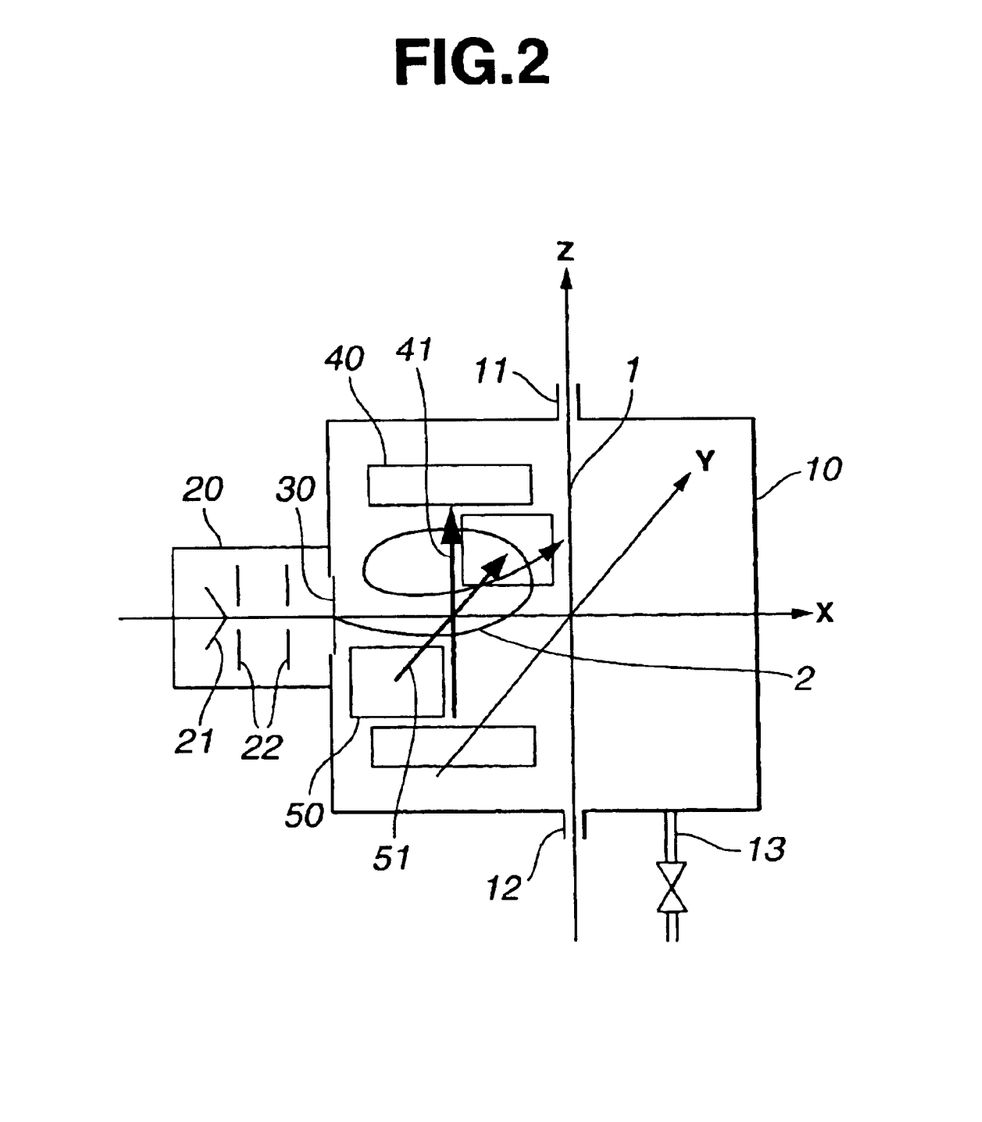
FIG. 2 is a schematic cross-sectional view of an optical fiber preparing apparatus according to another embodiment of the invention.

Referring to FIG. 2, there is illustrated an optical fiber preparing apparatus used in another embodiment of the invention. The apparatus includes a cylindrical electron beam irradiating chamber or zone 10 having closed opposite end faces which are provided with openings 11 and 12 serving as an inlet and an outlet for a traveling optical fiber 1, respectively. The optical fiber 1 enters the EB irradiating chamber 10 from one opening or inlet 11, passes the chamber 10 at the center where an electron beam 2 is irradiated, and exits from the other opening or outlet 12. A means for establishing an inert gas atmosphere in the chamber 10 in the form of an inert gas line 13 is connected to the other end face of the chamber 10. The line 13 supplies an inert gas such as helium or nitrogen to the chamber 10 so that irradiation of the optical fiber 1 with electron beams in the chamber 10 can be performed in the inert gas atmosphere.

An electron beam producing unit 20 in the form of a closed box includes a means 21 for emitting electrons, a means 22 for accelerating the electrons, and optionally a means for converging the accelerated electrons (not shown). The electron beam producing unit 20 is joined to the electron beam irradiating chamber 10 so that the electron beam 2 is projected into the chamber 10.

There may be arranged one or more electron beam producing units 20 around the irradiating chamber 10. Where a plurality of electron beam producing units 20 are used, they are preferably arranged at substantially equal intervals so as to surround the irradiating chamber 10. For instance, where three electron beam producing units 20 are used, they are preferably spaced apart 120° about the irradiating chamber 10.

At the side wall of the unit 20 through which the electron beam 2 penetrates toward the irradiating chamber 10, a window 30 is disposed perpendicular to the propagating path of electron beam 2. The electron beam 2 passes the window 30 and enters the irradiating chamber 10 held under substantially atmospheric pressure.

As mentioned above, the electron beam producing unit includes the electron emitting means, electron accelerating means and optionally electron converging means. The electron emitting means may be any well-known electron emitting source utilizing the phenomenon of thermionic emission, secondary electron emission, field electron emission or photoelectric emission, for example, hot cathodes of tungsten or lanthanum boride and glow discharge cold cathodes. The electron accelerating means may be any well-known electron accelerator utilizing a dc electric field or radio-frequency electric field, such as a dc electric field developed by applying a high dc voltage between parallel plate electrodes or a radio-frequency electric field developed by applying a radio-frequency voltage across a cavity resonator. The electron converging means may be any well-known electron converging means including electrostatic lenses and magnetic lenses such as an electrostatic lens constructed of three electrode plates and a magnetic lens constructed of permanent magnets or solenoids.

The electron beam producing unit may utilize a rod-, plate- or disc-shaped filament and perforated grids of the same shape, as long as it can emit and accelerate electrons toward the optical fiber.

The window serving as the partition between the vacuum electron beam producing unit and the electron beam irradiating chamber should maintain the vacuum in the unit, but allow electrons to be transmitted thereby. A foil of an element having a relatively small atomic number such as Ti, Al, Si or C is often used since it has strength and permeability to electrons. The gage of the foil is generally set in the range of 3 to 15 μm so as to meet the above requirement.

In the above-mentioned apparatus which is used to irradiate electron beams to the coated optical fiber, according to the second embodiment of the invention, a magnetic field generating means 40 and an electric field generating means 50 are disposed in the irradiating chamber 10 for creating a magnetic field 41 and an electric field 51 within the irradiating chamber 10 and across the path of electron beam 2 whereby the electron beam is converged at the coated optical fiber.

While electrons are scattered upon passage through the window, the electric field and magnetic field act in a cooperative manner to converge such scattered electrons toward the optical fiber for thereby improving the efficiency of electron irradiation to the optical fiber. The electric field can be produced, for example, by applying a dc voltage between parallel plate electrodes. The magnetic field can be produced by a permanent magnet or an electromagnet constructed of solenoids.

The directions of the electric field and magnetic field are not critical as long as an improvement in irradiation efficiency is achievable. The electric and magnetic fields may be applied in any direction perpendicular, parallel or oblique to the optical fiber. It is preferred to apply a magnetic field having a direction parallel to the traveling direction of the optical fiber and an electric field having a direction perpendicular to the traveling direction of the optical fiber because the electrons which have been scattered upon passage through the window can be two-dimensionally converged on the optical fiber.

More illustratively, provided that the propagating direction of electron beam is X axis, a direction perpendicular to X axis in a horizontal plane is Y axis, and the traveling direction of optical fiber perpendicular to X and Y axes is Z axis, as shown in FIG. 2, it is preferred to apply the magnetic field in the Z axis direction and the electric field in the Y axis direction. The window is disposed in a direction perpendicular to the magnetic and electric fields to face the optical fiber so that the magnetic flux density B of the magnetic field and the strength E of the electric field may satisfy the equation:

$$X = 2n\pi mE/eB^2$$

wherein X is the distance between the window and the optical fiber, m is the mass of an electron, e is the charge of an electron, π is the circle ratio and n is an integer of at least 1.

The distance from the window to the optical fiber is usually set to 1 to 30 mm, especially 3 to 20 mm because a shorter distance may have the risk of contact and a longer distance may increase energy dissipation by the atmosphere gas. An electric field strength of at least 0.1 kV/mm is desired since too weak an electric field may lead to a low drift velocity and noticeable energy dissipation by the atmosphere gas. On the other hand, an electric field strength of up to 10 kV/mm is desired since too strong an electric field may increase the risk of electric discharge. An electric field strength of 0.3 to 3 kV/mm is especially desired. A magnetic flux density of at least 0.01 T is desired since too low a magnetic flux density may increase the rotation radius of an electron and energy dissipation by the atmosphere gas. On the other hand, a magnetic flux density of up to 1 T is desired since a stronger magnetic field requires a correspondingly stronger electric field with the increased risk of electric discharge. A magnetic flux density of 0.03 to 0.3 T is especially desired. The electric field may be applied in pulses in order to prevent self-sustaining discharge by the electric field.

It is possible to provide a plurality of magnetic fields and electric fields associated with a plurality of electron beam producing units, in order to augment the advantages of the invention.

In the method for preparing an optical fiber according to the invention, a liquid composition of an electron beam-curable resin is applied to a bare optical fiber or a coated optical fiber having a primary or secondary coating on a bare optical fiber, the coated optical fiber is passed through the electron beam irradiating apparatus where electron beams are irradiated to the composition for curing, and the optical fiber with the cured coating is finally wound up by a separate take-up means.

Herein, the irradiating chamber of the electron beam irradiating apparatus (or the zone through which the optical fiber passes) has an inert gas atmosphere under substantially atmospheric pressure. The presence of oxygen in the irradiating chamber causes electrons to be scattered and inhibits radical polymerization of the resin resulting in the resin surface being under-cured. The inert gas is preferably an element having a small atomic number such as He and $N_2$. In particular, He is desirable for minimal scattering of electrons. A vacuum system, if used for continuous irradiation, is difficult to maintain the degree of vacuum constant and causes the resin to foam. A pressurized system, if used for continuous irradiation, enhances the scattering of electrons and hence, reduces the irradiation efficiency. A pressure capable of avoiding such problems, that is, substantially atmospheric pressure is thus preferred.

The irradiation intensity of electron beams can be adjusted, preferably in unison with the traveling speed of the optical fiber, by altering the current flow through the filament for emitting electrons.

The method of the invention is applicable to any embodiments wherein a liquid electron beam-curable resin composition is applied and cured to an optical fiber strand, for example, one embodiment wherein a liquid electron beam-curable resin composition to form a primary coating is applied and cured to a bare optical fiber; another embodiment wherein liquid electron beam-curable resin compositions to form primary and secondary coatings are successively applied to a bare optical fiber and simultaneously cured; a further embodiment wherein a liquid electron beam-curable resin composition to form a secondary coating is applied and cured to an optical fiber having a primary coating already cured thereon; and a still further embodiment wherein a liquid electron beam-curable resin composition is applied and cured to a bundle of plural optical fibers having primary and secondary coatings already cured thereon to thereby form an optical fiber tape. As understood from the last mentioned embodiment, the manufacture of optical fiber tape is encompassed within the scope of the invention.

The liquid electron beam-curable resin composition used herein is selected from well-known compositions, for example, compositions comprising a polyether urethane acrylate oligomer as a main component and a reactive diluent for viscosity adjustment. The polyether urethane acrylate oligomer can be prepared by reacting a polyether such as polypropylene glycol or polytetramethylene glycol with a diisocyanate such as 2,4-tolylene diisocyanate or 4,4'-diphenylmethane diisocyanate and optionally, a hydroxyl-bearing acrylate such as hydroxyethyl acrylate. Oligomers having a number average molecular weight of about 800 to 10,000 are desirable for the properties of cured coating. The reactive diluent is preferably selected from compounds having an ethylenically unsaturated group, for example, lauryl acrylate, isobornyl acrylate, N-vinyl caprolactam, ethylene glycol diacrylate, and trimethylol propane triacrylate. The amounts of these components are determined as appropriate although 20 to 200 parts by weight of the reactive diluent is preferably blended with 100 parts by weight of the polyether urethane acrylate oligomer.

The technique of applying a liquid electron beam-curable resin composition to an optical fiber may be any well-known application technique, such as die coating technique. In the embodiment wherein the liquid electron beam-curable resin composition used is a composition based on a polyether urethane acrylate oligomer, electrons are irradiated to the composition so as to give an absorption dose of about 10 to 100 kGy. An absorption dose of less than about 10 kGy may result in under-cured resin whereas in a dose of more than about 100 kGy, the resin can be degraded by electron beams. The oxygen concentration in the atmosphere should desirably be less than about 1,000 ppm and more desirably 10 to 300 ppm. An oxygen concentration in excess of about 1,000 ppm may result in an under-cured resin surface.

The electron beams are preferably composed of electrons accelerated at a voltage of 60 to 160 kV. More preferred electron beams are those in which accelerated electrons have a maximum energy of up to about 120 keV and an average energy of at least about 60 keV. As mentioned previously, the optical fiber preparation method of the invention encompasses the preparation of an optical fiber tape. For the tape preparation, it is preferred to irradiate electron beams in which accelerated electrons have a maximum energy of up to about 160 keV and an average energy of at least about 120 keV.

After a liquid electron beam-curable resin composition is applied to a bare optical fiber and irradiated with electron beams for curing in the electron beam irradiating apparatus, the optical fiber having the resin coating cured thereon is wound up by a separate take-up means, though not shown.

EXAMPLE

Examples of the invention are given below by way of illustration and not by way of limitation.

Example 1

Figure 3:
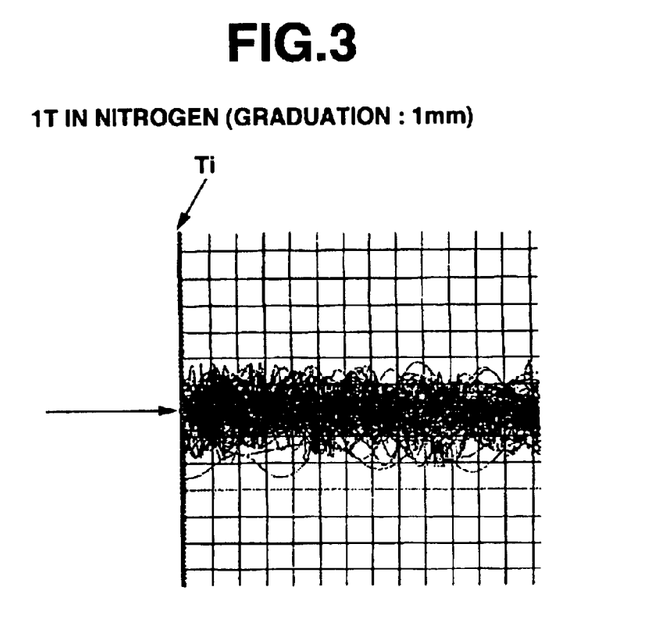
FIG. 3 is a diagram illustrating electron tracks in Example 1.

Using the apparatus shown in FIG. 1, thermal electrons are emitted in vacuum ($10^{-4}$ Pa), accelerated at a voltage of 100 kV, and directed to a titanium foil having a gage of 10 $\mu$m. After passage through the foil, the accelerated electrons move forward in a nitrogen atmosphere under atmospheric pressure and in a magnetic field having a magnetic flux density of 1 T applied in a direction parallel to the electrons and perpendicular to the path of an optical fiber. The tracks of electrons were simulated by a computer in accordance with the method disclosed in Jap. J. Appl. Phys., Vol. 10, No. 6, June 1971, pp. 678–686, J. Appl. Phys., Vol. 43, No. 10, October 1972, pp. 4233–4249, J. Appl. Phys., Vol. 52, No. 7, July 1981, pp. 4396–4405, and J. Appl. Phys., Vol. 66, No. 12, December 1989, pp. 6059–6064, combined with the Lorentz force in a magnetic field and the relativistic effect. The results are shown in FIG. 3. The efficiency of electron irradiation to an optical fiber of 250 $\mu$m diameter spaced a distance of 10 mm from the titanium foil, that is, the energy of electron beams incident on the optical fiber divided by the energy of electron beams irradiated was 8.7%.

Example 2

Figure 4:
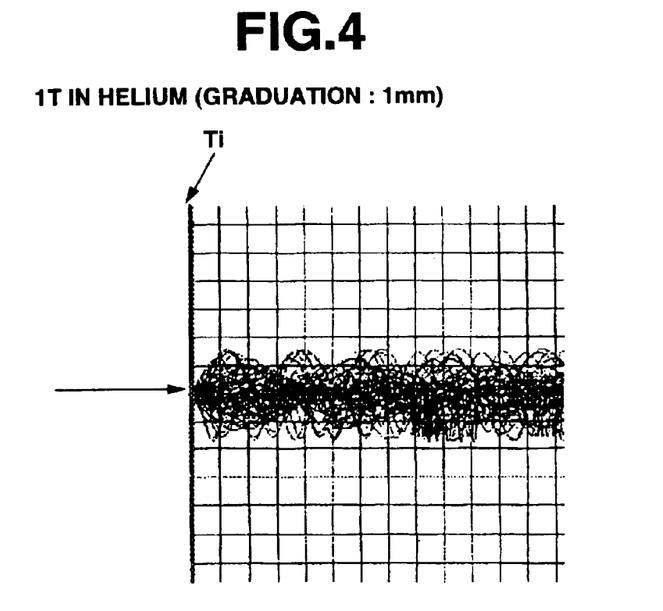
FIG. 4 is a diagram illustrating electron tracks in Example 2.

The tracks of electrons were simulated under the same conditions as in Example 1 except that a helium atmosphere was used instead of the nitrogen atmosphere. The results are shown in FIG. 4. The efficiency of electron irradiation to an optical fiber of 250 $\mu$m diameter spaced a distance of 10 mm from the titanium foil was 17.8%.

Comparative Example 1

Figure 5:
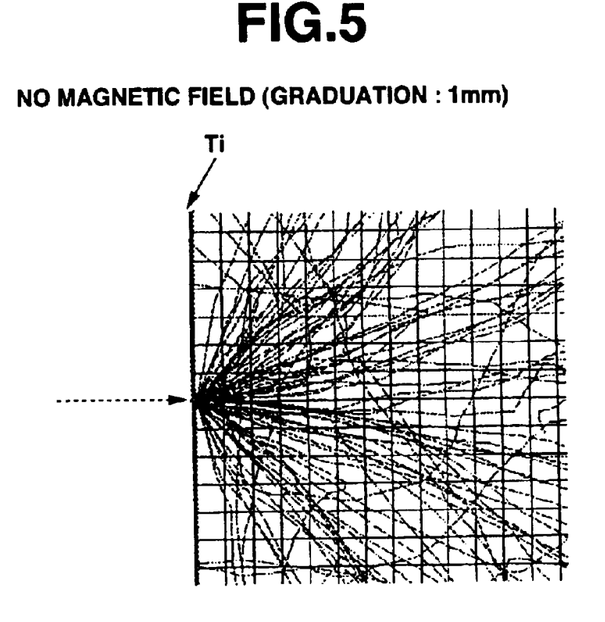
FIG. 5 is a diagram illustrating electron tracks in Comparative Example 1.

The tracks of electrons were simulated under the same conditions as in Example 1 except that the magnetic field was omitted. The results are shown in FIG. 5. The efficiency of electron irradiation to an optical fiber of 250 $\mu$m diameter spaced a distance of 10 mm from the titanium foil was 0.7%.

Example 3

Using the apparatus shown in FIG. 2, thermal electrons are emitted in vacuum ($10^{-4}$ Pa), accelerated at a voltage of 100 kV, and directed to a titanium foil (window) having a gage of 10 $\mu$m. After passage through the foil, the accelerated electrons move forward in a He atmosphere under atmospheric pressure while a magnetic field having a magnetic flux density of 0.05 T is applied in a direction parallel to the traveling direction of an optical fiber and an electric field having a strength of 1 kV/mm is applied in pulses in a direction perpendicular to the traveling direction of the optical fiber. Electron irradiation to an optical fiber of 250 $\mu$m diameter spaced a distance of 14.3 mm from the window was simulated by a computer (scattering by He was neglected). The results are shown in FIGS. 6 to 14.

Herein, E is the kinetic energy of electrons immediately after window passage, $\theta$ is the angle the velocity vector of electrons immediately after window passage forms with the XY plane, and $\phi$ is the angle the velocity vector of electrons immediately after window passage forms with the X axis.

Figure 6:
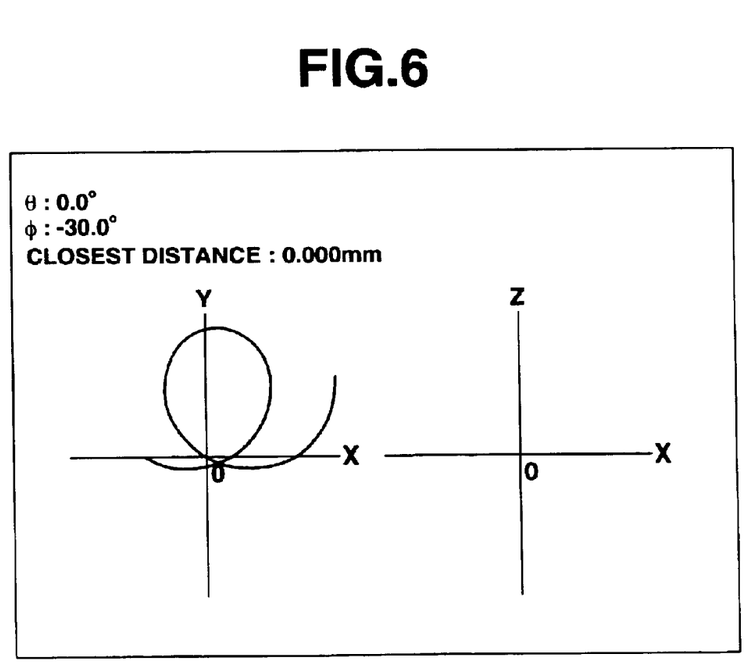
FIG. 6 is a diagram illustrating an exemplary electron central orbit in Example 3 wherein E=80 keV, $\theta=0°$ and $\phi=-30°$.

FIG. 6 illustrates an electron central orbit wherein E=80 keV, $\theta$=0°, $\phi$=−30° and the closest distance=0.000 mm.

Figure 7:
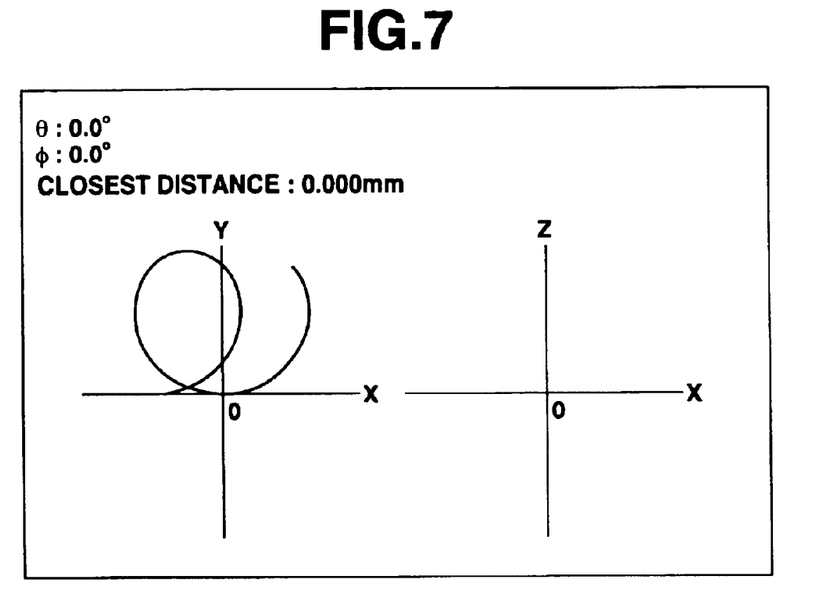
FIG. 7 is a diagram illustrating an exemplary electron central orbit in Example 3 wherein E=80 keV, $\theta=0°$ and $\phi=0°$.

FIG. 7 illustrates an electron central orbit wherein E=80 keV, $\theta$=0°, $\phi$=0° and the closest distance=0.000 mm.

Figure 8:
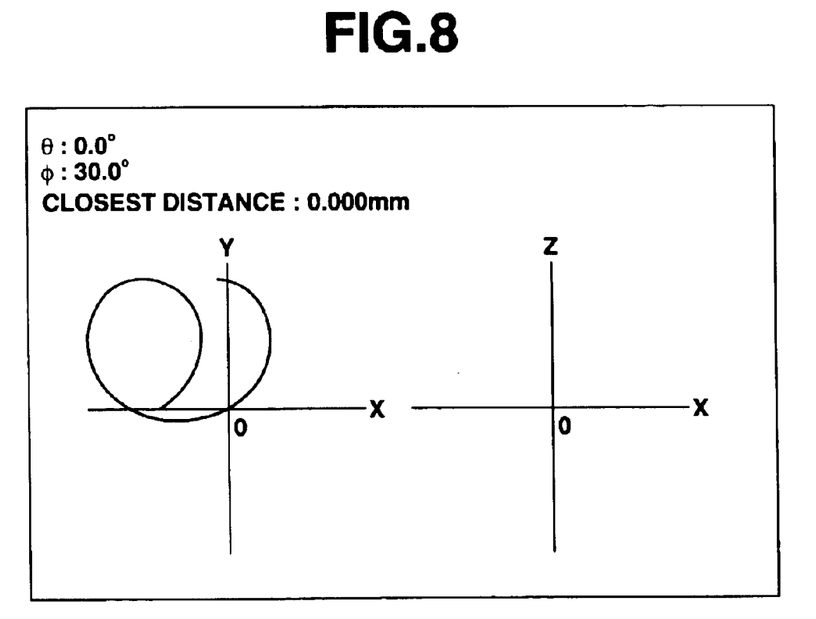
FIG. 8 is a diagram illustrating an exemplary electron central orbit in Example 3 wherein E=80 keV, $\theta=0°$ and $\phi=30°$.

FIG. 8 illustrates an electron central orbit wherein E=80 keV, $\theta$=0°, $\phi$=30° and the closest distance=0.000 mm.

Figure 9:
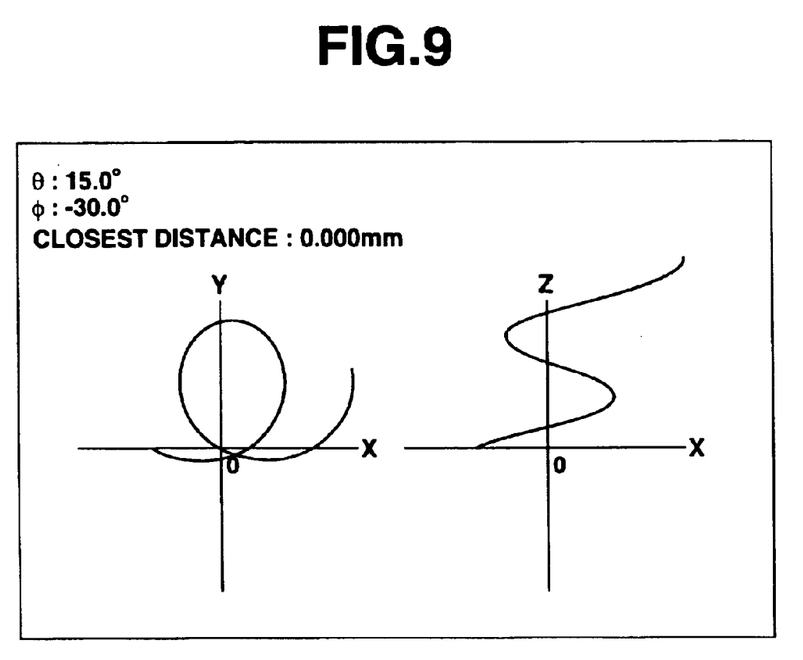
FIG. 9 is a diagram illustrating an exemplary electron central orbit in Example 3 wherein E=80 keV, $\theta=15°$ and $\phi=-30°$.

FIG. 9 illustrates an electron central orbit wherein E=80 keV, $\theta$=15°, $\phi$=−30° and the closest distance=0.000 mm.

Figure 10:
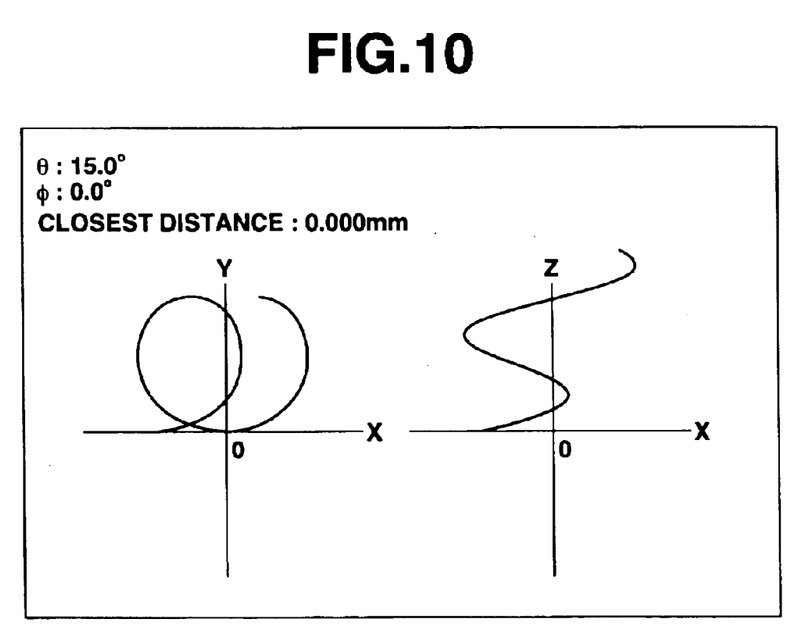
FIG. 10 is a diagram illustrating an exemplary electron central orbit in Example 3 wherein E=80 keV, $\theta=15°$ and $\phi=0°$.

FIG. 10 illustrates an electron central orbit wherein E=80 keV, $\theta$=15°, $\phi$=0° and the closest distance=0.000 mm.

Figure 11:
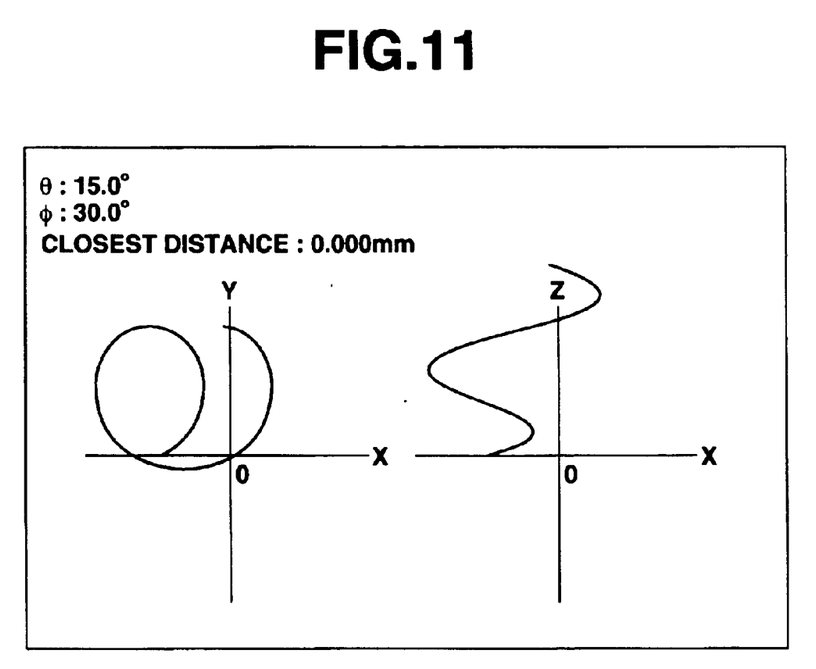
FIG. 11 is a diagram illustrating an exemplary electron central orbit in Example 3 wherein E=80 keV, $\theta=15°$ and $\phi=30°$

FIG. 11 illustrates an electron central orbit wherein E=80 keV, $\theta$=15°, $\phi$=30° and the closest distance=0.000 mm.

Figure 12:
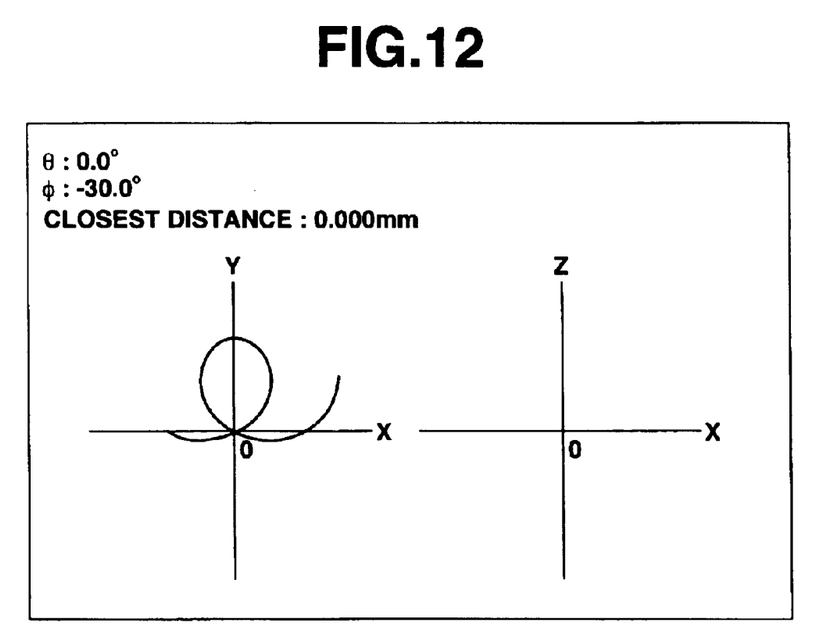
FIG. 12 is a diagram illustrating an exemplary electron central orbit in Example 3 wherein E=40 keV, $\theta=0°$ and $\phi=-30°$.

FIG. 12 illustrates an electron central orbit wherein E=40 keV, $\theta$=0°, $\phi$=−30° and the closest distance=0.000 mm.

Figure 13:
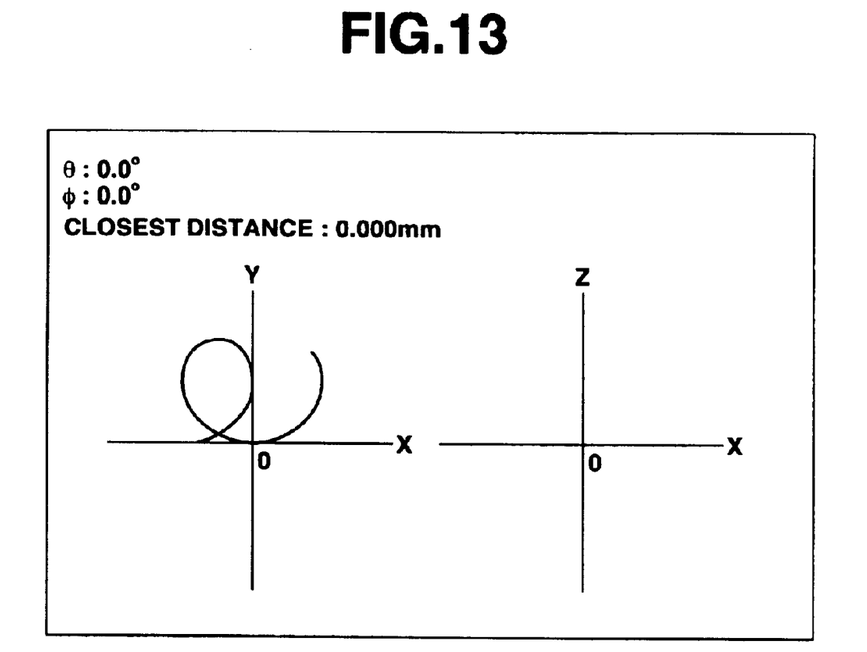
FIG. 13 is a diagram illustrating an exemplary electron central orbit in Example 3 wherein E=40 keV, $\theta=0°$ and $\phi=0°$.

FIG. 13 illustrates an electron central orbit wherein E=40 keV, $\theta$=0°, $\phi$=0° and the closest distance=0.000 mm.

Figure 14:
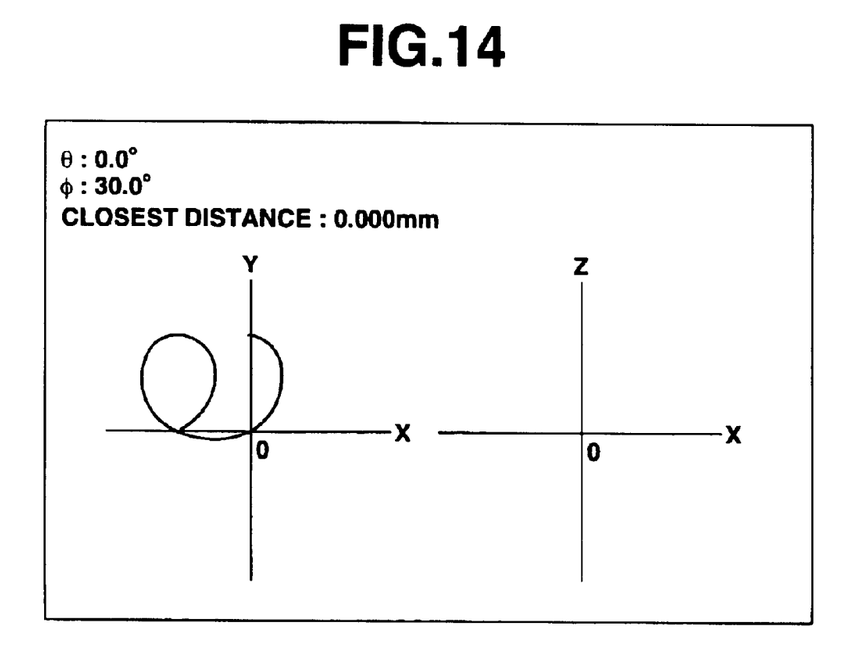
FIG. 14 is a diagram illustrating an exemplary electron central orbit in Example 3 wherein E=40 keV, $\theta=0°$ and $\phi=30°$.

FIG. 14 illustrates an electron central orbit wherein E=40 keV, $\theta$=0°, $\phi$=30° and the closest distance=0.000 mm.

It is ascertained from the results that the electrons which have been scattered by the window are two-dimensionally converged on the optical fiber.

According to the invention, a liquid electron beam-curable resin composition applied to an optical fiber can be effectively cured by irradiating electron beams at a high efficiency, insuring the effective preparation of the optical fiber.

Japanese Patent Application Nos. 2001-043407 and 2001-189609 are incorporated herein by reference.

Reasonable modifications and variations are possible from the foregoing disclosure without departing from either the spirit or scope of the present invention as defined by the claims.

What is claimed is:

1. A method for preparing an optical fiber, comprising the steps of:
    applying a liquid composition of an electron beam-curable resin to a bare optical fiber or a coated optical fiber having a primary or secondary coating on a bare optical fiber,
    irradiating electron beams to the resin composition on the optical fiber for curing while the optical fiber passes a zone under substantially atmospheric pressure, and
    providing a magnetic field having a magnetic flux density of at least 0.1 T in the zone for thereby improving the efficiency of electron irradiation.

2. The method of claim 1 wherein the zone has an inert gas atmosphere.

3. The method of claim 2 wherein the inert gas is helium.

4. The method of claim 1 wherein the electron beams have been accelerated at a voltage of 60 to 160 kV.

5. The method of claim 1 wherein the liquid composition comprises a polyether urethane acrylate oligomer and a reactive diluent.

6. A method for preparing an optical fiber, comprising the steps of:
    applying a liquid composition of an electron beam-curable resin to a bare optical fiber or a coated optical fiber having a primary or secondary coating on a bare optical fiber,
    irradiating electron beams to the resin composition on the optical fiber for curing while the optical fiber passes a zone under substantially atmospheric pressure, and
    providing an electric field having an electric field strength of at least 0.1 KV/mm and a magnetic field having a magnetic flux density of at least 0.01 T in the zone so that the electron beams pass across the electric field and the magnetic field to two-dimensionally converge on the optical fiber.

7. The method of claim 6 wherein the magnetic field has a direction parallel to the path of the optical fiber, and the electric field has a direction perpendicular to the path of the optical fiber.

8. The method of claim 6 wherein the zone has an inert gas atmosphere.

9. The method of claim 8 wherein the inert gas is helium.

10. The method of claim 6 wherein the electron beams have been accelerated at a voltage of 60 to 160 kV.

11. The method of claim 6 wherein the liquid composition comprises a polyether urethane acrylate oligomer and a reactive diluent.

* * * * *